Sept. 3, 1968 H. J. REICHARDT 3,400,293
ADAPTER BULB FOR PROVIDING EXTERNAL ELECTRICAL
CONNECTION BETWEEN POWERED
VEHICLES AND TRAILERS
Filed Jan. 5, 1965 3 Sheets-Sheet 1

INVENTOR
HARRY J. REICHARDT

BY *Semmes & Semmes*

ATTORNEYS

Sept. 3, 1968  H. J. REICHARDT  3,400,293
ADAPTER BULB FOR PROVIDING EXTERNAL ELECTRICAL
CONNECTION BETWEEN POWERED
VEHICLES AND TRAILERS
Filed Jan. 5, 1965  3 Sheets-Sheet 2

INVENTOR
HARRY J. REICHARDT

BY Semmes & Semmes
ATTORNEYS

INVENTOR
HARRY J. REICHARDT

BY Semmes & Semmes

ATTORNEYS

United States Patent Office 3,400,293
Patented Sept. 3, 1968

3,400,293
ADAPTER BULB FOR PROVIDING EXTERNAL ELECTRICAL CONNECTION BETWEEN POWERED VEHICLES AND TRAILERS
Harry J. Reichardt, Philadelphia, Pa., assignor to Arcoa, Incorporated, Portland, Oreg., a corporation of Oregon
Filed Jan. 5, 1965, Ser. No. 423,472
8 Claims. (Cl. 313—318)

ABSTRACT OF THE DISCLOSURE

This is a tail light assembly which enables the driver towing a vehicular trailer to adapt the vehicle electrical system to the trailer by plugging into one of the two conventional vehicular tail lights. The invention is an adapter bulb and connecting assembly providing external electrical connection between powered vehicles and trailers thereof.

Coupling systems for providing eletcrical connection between cars or trucks and trailer lighting systems are the subject of numerous inventions as disclosed in patents such as Hunt (Re. 24,259), Madigan (2,693,539) and Frieden (2,989,645), for example. However, such conventional "internal" electrical coupling systems are unsuitable for use with station wagons since the "hook-up" time involving the removal of station wagon interior panels, is quite excessive. The present "external" electrical coupling system, featuring a novel adapter bulb, provides adjunctive electrical connection without the necessity of removing station wagon interior panels, resulting in a substantial reduction in time required for "hook-up." The novel adapter bulb disclosed herein is, of course, designed for use with conventional automobile tail light socket assemblies.

Accordingly, it is an object of the present invention to provide a new and more efficient coupling device for making electrical connection between powered vehicles and trailers.

Another object of the present invention is to provide an efficient coupling device for making external electrical connection between station wagons and trailers eliminating time consuming removal of station wagon interior panels.

Still another object of the present invention is to provide external adjunctive electrical connection between station wagons and trailers with the use of an adapter bulb designed to fit in conventional tail light socket assemblies.

Still a further object of the present invention is to reduce electrical "hook-up" time between station wagons and trailers with the use of an adapter bulb to be inserted within conventional tail light sockets of station wagons having inaccessible wiring otherwise requiring the removal of interior panels.

Yet additional objects of the present invention will become apparent from the ensuing specification and drawings wherein.

Figure 1:
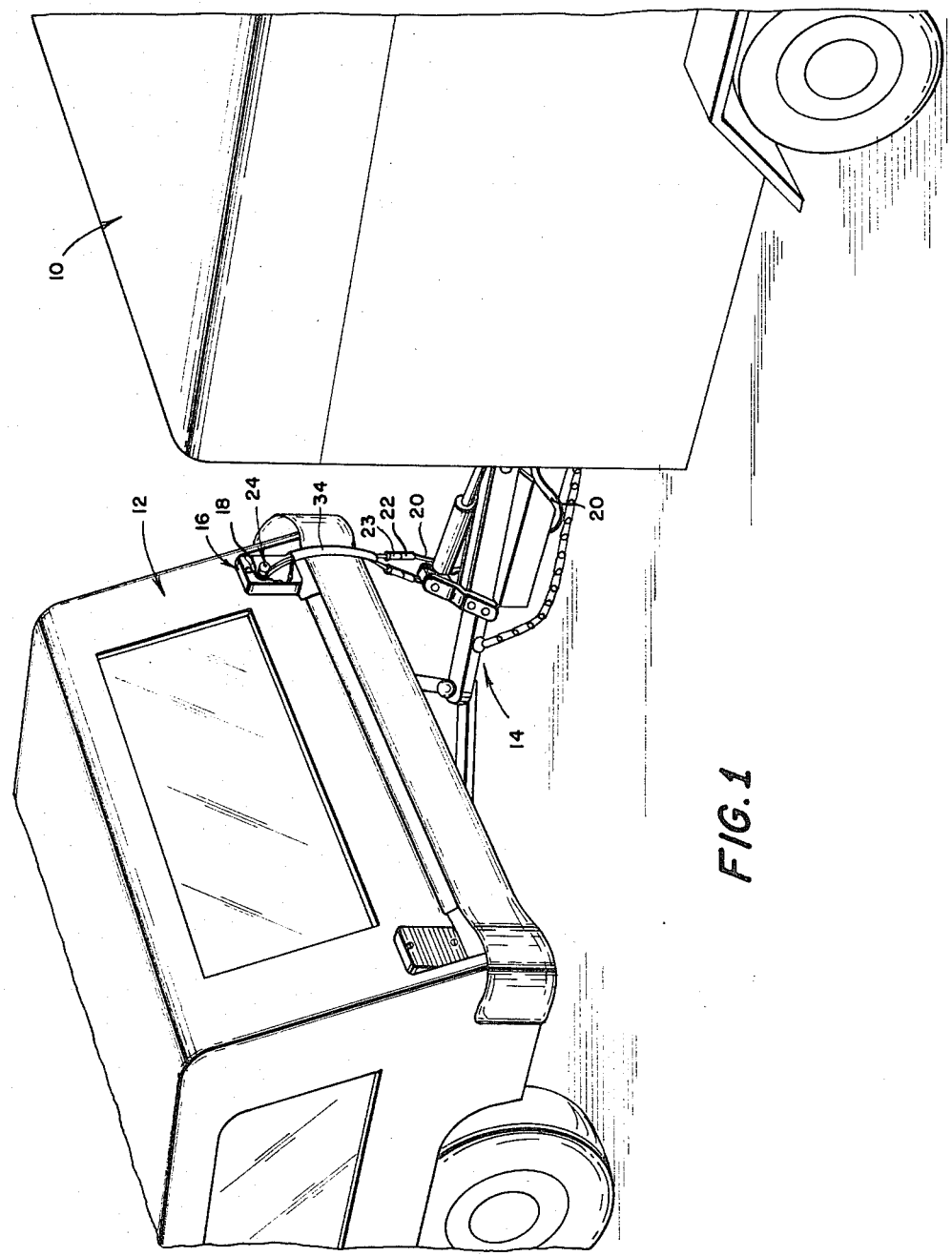
FIG. 1 is a perspective view illustrating external electrical connection between the tail light assembly of a station wagon and the electrical system of a trailer with the use of the adapter bulb assembly disclosed herein.

As seen in FIG. 1, a conventional trailer 10 is attached to station wagon 12 with the use of hitch assembly 14. The reference numeral 16 generally designates the tail light assembly of station wagon 12 which includes socket 18. Lead wires 20 from the electrical system of trailer 10 extend along hitch 14 and terminate in male connectors 22. The lighting system of the trailer itself, being conventional, does not constitute a part of the present invention and is not illustrated.

Figure 2:
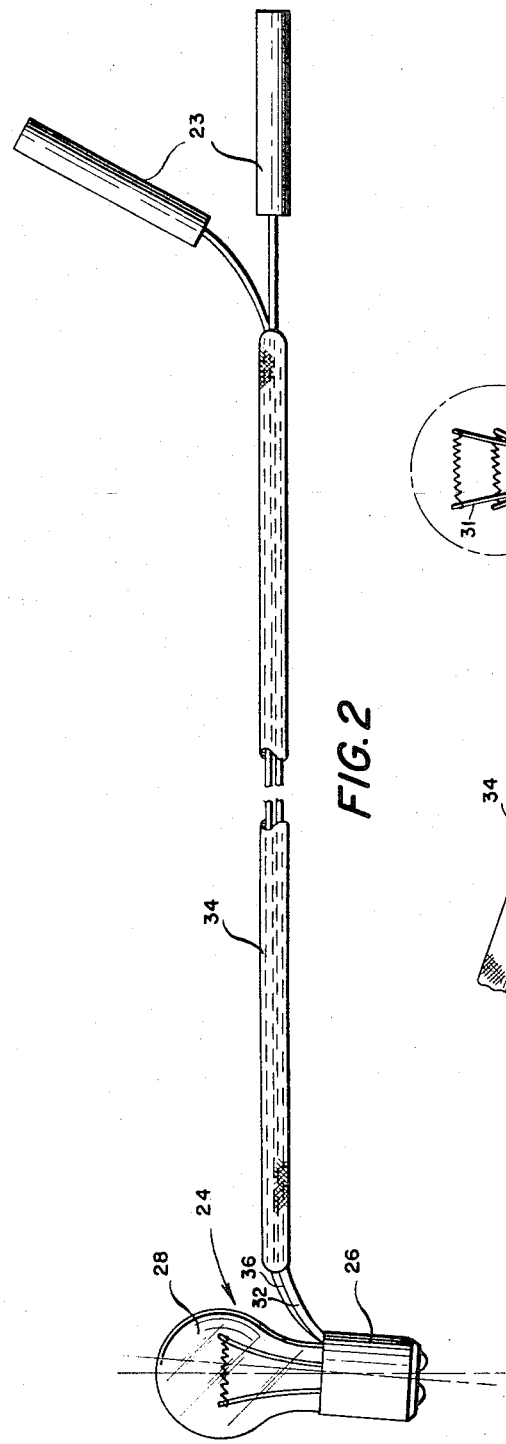
FIG. 2 is a side view of a preferred embodiment of the adapter bulb assembly and associated harness.
Figure 3:
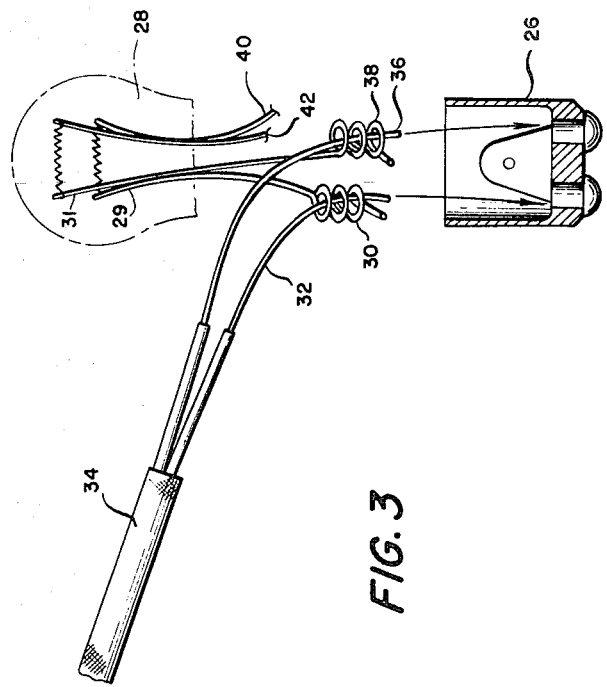
FIG. 3 is an exploded view of the preferred adapter bulb assembly.

The preferred adapter bulb assembly 24, as seen in FIGS. 2 and 3, includes a base assembly 26 terminating at the bottom thereof in a suggested S.A.E. type C–2 indexing candelabra bayonet double contact and a suggested No. 1016 S.A.E. S–8 glass envelope generally designated as 28. Within base 26 and envelope 28 is located filament 29 terminating in lead 30 which is soldered to pig-tail lead 32 contained within harness 34. Similarly, long filament 31 terminates in lead 38 which is soldered to pig-tail lead 36. Grounds 40 and 42 extend from filaments 29 and 31 and are soldered to base 26. As seen in FIG. 2, reference numeral 23 generally designates female connectors and associated boots for receiving male connectors 22.

As seen in FIGS. 2 and 3, envelope 28 is eccentrically seated within base 26 so as to provide space between the bottom of envelope 28 and a selected portion of base 26. This "eccentric" relationship provides sufficient space for pig-tail leads 32 and 36 to pass downwardly along the inner walls of base 26 to their eventual contact with filament leads 30 and 38 respectively.

With the use of the preferred adapter bulb of FIGS. 2 and 3, lengthy "hook-up" time is reduced by eliminating the necessity of removing the station wagon internal panels to sort and trace wires. With the present invention, "hook-up" is accomplished simply by removing the existing tail light lens of the station wagon, removing the existing bulb, installing the new adapter bulb assembly 24 with pig-tail leads 32 and 36, and replacing the lens including passing pig-tail leads 32 and 36 between lens and gasket. Under this new procedure, approximately 5 to 10 minutes is required to complete "hook-up" as opposed to the normal 30 minute to one hour period necessitated by the removal of station wagon interior paneling involving the sorting and tracing of wires to make "permanent" hook-up.

Figure 4:
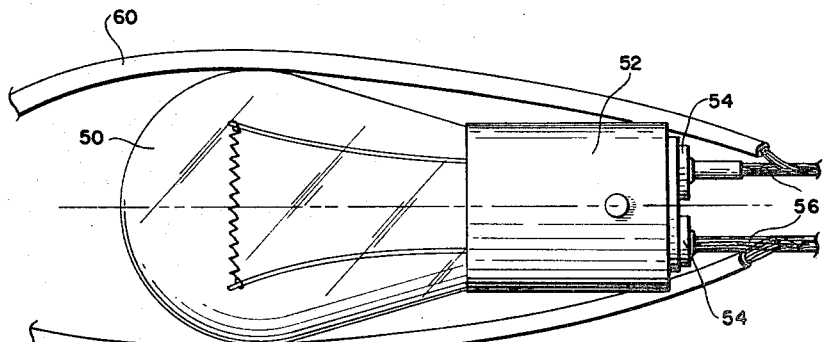
FIG. 4 is a top view of a second embodiment of the adapter bulb assembly illustrating the connection of filament leads and trailer leads.
Figure 5:
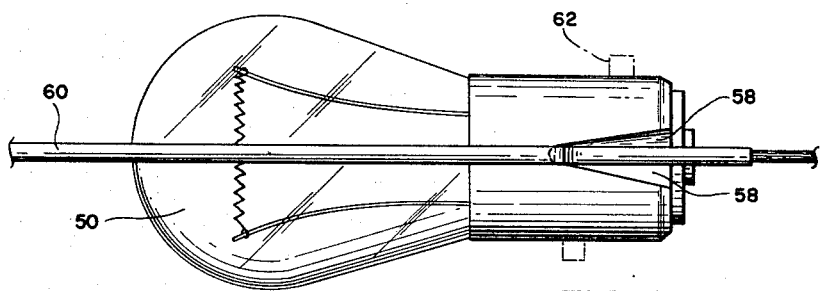
FIG. 5 is a side view of the second embodiment of the subject bulb connection assembly.
Figure 6:
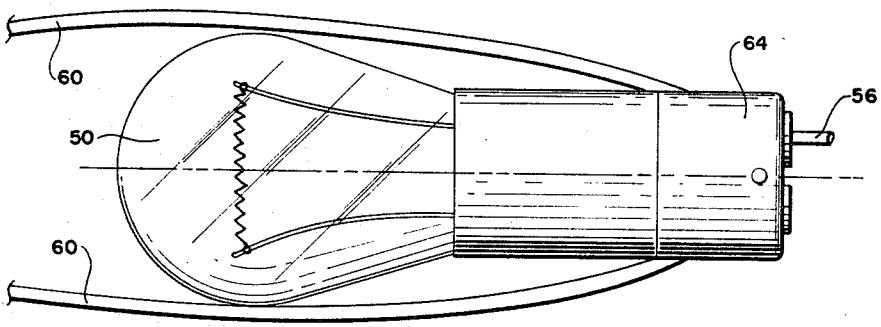
FIG. 6 is a top view of the second embodiment of bulb connection assembly illustrating the cut off base assembly in position.

A second embodiment of the subject adapter bulb assembly is illustrated in FIGS. 4–6, wherein reference numeral 50 generally designates a glass envelope symmetrically seated within housing 52 which terminates in contacts 54 to which filament wires 56 are soldered. On opposite sides of housing 52 are located tapered slots 58 which are cut so as to permit leads to be fed into contact with filament wires 56. As seen in FIG. 5, the conventional pins 62 are ground off while the end of housing 52 is beveled to mate with base portion 64 (FIG. 6). Connection between filament wires 56 and leads is accomplished by bending wires 56 over and then soldering. As base portion 64 is inserted in place, filament wires 56 are soldered and cut flush with the surface of portion 64. Lead wires terminate in female connectors (not shown) for electrical connection with the male connectors 22 (FIG. 1) of the trailer electrical system.

Manifestly, various changes in construction and design of the subject adapter bulb and associated coupling assembly may be employed without departing from the spirit and scope of invention, as defined in the subjoined claims.

I claim:
1. An adapter bulb for inserting within the tail light assembly of an automobile for providing external electrical connection to a trailer, comprising:
   (A) a conventional base assembly terminating at the bottom thereof in an indexing candelabra bayonet double contact portion;
   (B) a glass envelope seated eccentrically within said base assembly so as to define near the bottom thereof a space between said envelope and a portion of said base assembly;
   (C) filment and ground means located within said glass envelope and base assembly, said filament means terminating in lead portions; and
   (D) pig-tail lead wires connected at one end thereof to the said filament lead portions, said wires passing through said space defined by said glass envelope and said base assembly.

2. An adapter bulb as in claim 1, including electrical connectors attached to the other end of said pig-tail lead wires.

3. An adapter bulb assembly for providing electrical connection between the tail light assembly of an automobile and lead wires of a trailer electrical system, comprising:
   (A) a conventional base assembly terminating in a contact portion;
   (B) glass envelope means seated eccentrically within said base assembly so as to define a space between said envelope and a portion of said base assembly;
   (C) filament and ground means located within said glass envelope and base assembly, said filament means terminating in lead portions; and
   (D) pig-tail leads connected at one end thereof to said filament lead portions, said pig-tail leads passing through said space defined by said glass envelope and said base assembly.

4. An adapter bulb assembly for inserting within the socket portion of a tail light of an automobile for providing external electrical connection to the lighting system of a trailer, comprising:
   (A) conventional base assembly means including contact portion;
   (B) glass envelope means seated eccentrically within said base assembly means such that the center line of said base assembly means intersects the center line of said glass envelope means at a predetermined distance below the top of said base assembly means thus defining a space between said envelope means and a portion of said base assembly means;
   (C) filament and ground means located within said glass envelope means and said base assembly means, said filament means terminating in lead portions; and
   (D) pig-tail lead wires connected at one end thereof to said filament lead portions, said pig-tail lead wires passing through said space defined by said glass envelope means and said base assembly.

5. An adapter bulb assembly for inserting within the tail light socket of a station wagon for providing external electrical connection to lead wires of a trailer lighting system, comprising:
   (A) conventional base means including a contact portion;
   (B) glass envelope means seated eccentrically within said base means defining a space therebetween;
   (C) filament and ground means located within said glass envelope means and said base means, said filament means terminating in lead portions; and
   (D) pig-tail lead wires connected at one end thereof to said filament lead portions, said pig-tail lead wires passing between said glass envelope means and said base means.

6. An adapter bulb as in claim 4, including harness means attached to said pig-tail lead wires, said harness terminating in connectors for attachment to said trailer lighting system lead wires.

7. An adapter bulb assembly for inserting within the tail light socket of a powered vehicle for providing external electrical connection to lead wires of a trailer lighting system, comprising:
   (A) base means including a contact portion and opposed exterior slots;
   (B) glass envelope means seated symmetrically within said base means;
   (C) filament and ground means located within said glass envelope means and said base means, said filament means terminating in wires; and
   (D) lead means connected at one end thereof to said filament wires, said lead means passing through said slots within said base means and connected at the other end thereof to said trailer lighting system.

8. An adapter bulb assembly as in claim 7, wherein said base means includes tapered slots for enclosing selected portions of said lead means.

References Cited

UNITED STATES PATENTS

| | | | |
|---|---|---|---|
| 728,060 | 5/1903 | Whipple | 313—318 |
| 1,727,826 | 9/1929 | Harris | 313—318 |
| 1,774,646 | 9/1930 | Goudy | 339—166.1 |
| 1,842,543 | 1/1932 | Eckstein et al. | 339—163 |
| 1,905,843 | 4/1933 | Foulke | 313—318 |
| 2,660,679 | 11/1963 | Hunt | 307—10 |
| 3,286,255 | 11/1966 | Sanchez | 313—318 XR |

FOREIGN PATENTS 607,107  3/1926  France.

JOHN W. HUCKERT, *Primary Examiner.*

A. J. JAMES, *Assistant Examiner.*